United States Patent
Sieck et al.

(10) Patent No.: US 12,460,170 B2
(45) Date of Patent: Nov. 4, 2025

(54) METHODS AND SYSTEMS FOR PERFORMING PERFUSION CELL CULTURE

(71) Applicant: MERCK PATENT GMBH, Darmstadt (DE)

(72) Inventors: Jochen Sieck, Darmstadt (DE); Christian Schultheiss, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 587 days.

(21) Appl. No.: 17/770,451

(22) PCT Filed: Nov. 5, 2020

(86) PCT No.: PCT/EP2020/081033
§ 371 (c)(1),
(2) Date: Apr. 20, 2022

(87) PCT Pub. No.: WO2021/089661
PCT Pub. Date: May 14, 2021

(65) Prior Publication Data
US 2022/0380712 A1    Dec. 1, 2022

(30) Foreign Application Priority Data
Nov. 7, 2019  (EP) ..................... 19207666

(51) Int. Cl.
*C12M 1/00* (2006.01)
*C12M 1/26* (2006.01)
*C12M 1/34* (2006.01)

(52) U.S. Cl.
CPC ............ *C12M 29/10* (2013.01); *C12M 33/22* (2013.01); *C12M 41/30* (2013.01); *C12M 41/44* (2013.01)

(58) Field of Classification Search
None
See application file for complete search history.

(56) References Cited

U.S. PATENT DOCUMENTS

| | | | |
|---|---|---|---|
| 9,765,367 B2 | 9/2017 | Hafez | |
| 11,104,875 B2 * | 8/2021 | Hiller | ..................... C12M 27/02 |
| 11,193,103 B2 * | 12/2021 | Angelini | ................ C12M 29/04 |
| 2009/0280565 A1 | 11/2009 | Jolicoeur et al. | |
| 2014/0099711 A1 | 4/2014 | Shimoni et al. | |
| 2016/0186218 A1 | 6/2016 | Hafez | |
| 2016/0265017 A1 | 9/2016 | Zijlstra et al. | |

(Continued)

FOREIGN PATENT DOCUMENTS

| | | |
|---|---|---|
| CN | 1274752 A | 11/2000 |
| CN | 104263700 A | 1/2015 |

(Continued)

OTHER PUBLICATIONS

Al-Rubeai, Mohamed; Animal Cell Culture, vol. 9, Springer, New York, 2014 (Chapter 13, "Perfusion Processes," Veronique Chotteau, pp. 407-443) (Year: 2014).*

(Continued)

*Primary Examiner* — David W Berke-Schlessel
(74) *Attorney, Agent, or Firm* — EMD Millipore Corporation

(57) ABSTRACT

The present invention relates to methods and systems for performing perfusion cell culture whereby the supernatant of the bleed stream is recovered.

20 Claims, 11 Drawing Sheets

(56) References Cited

U.S. PATENT DOCUMENTS

| | | |
|---|---|---|
| 2016/0298072 A1 | 10/2016 | Laustsen et al. |
| 2018/0251716 A1 | 9/2018 | Laustsen et al. |
| 2018/0298323 A1 | 10/2018 | Lipkens et al. |
| 2019/0031997 A1 | 1/2019 | Hiller et al. |
| 2019/0153381 A1 | 5/2019 | Angelini et al. |
| 2020/0377918 A1 | 12/2020 | Ogawa et al. |
| 2020/0399585 A1 | 12/2020 | Takahashi et al. |

FOREIGN PATENT DOCUMENTS

| | | |
|---|---|---|
| CN | 207944110 U | 10/2018 |
| WO | 2015010192 A1 | 1/2015 |
| WO | 2018178063 A1 | 10/2018 |

OTHER PUBLICATIONS

International Search Report for PCT/EP2020/081033 dated Feb. 8, 2021.
Bielser J-M. et al., Biotechnology Advances, Elsevier, 2018 vol. 36(4), pp. 1328-1340.
Voisard D. et al., Biotechnology and Bioengineering, vol. 82, No. 7, Jun. 30, 2003, pp. 751-765.
Yang W.C. et al., J. of Biotechnology, Elsevier; 2016, 217, pp. 1-11.

\* cited by examiner

METHODS AND SYSTEMS FOR PERFORMING PERFUSION CELL CULTURE

The present invention relates to methods and systems for performing perfusion cell culture whereby the supernatant of the bleed stream is recovered.

The most common cultivation modes used in biomanufacturing are batch cell culture, fed-batch and perfusion cell culture. The reason for choosing one of those technologies lies in different factors linked to the protein and/or the host. Cells are cultivated either attached on carriers or in suspension. The easiest mode to operate is probably the batch bioreactor. After inoculation, cells grow and produce until a limitation due to media consumption is reached and cell density starts to decrease. The second very common process is fed-batch where nutrient limitations are prevented by adding highly concentrated feeds at different time points during the cultivation. The culture duration is therefore longer than in batch mode and the final productivity is increased.

A perfusion cell culture process permits bioreactors to run continuously over extended periods of time up to several months by constantly perfusing fresh medium through the culture, simultaneously providing fresh nutrients for the cells and removing spent media and optionally dead cells and target product while retaining high numbers of viable cells. The key advantages of perfusion technology include higher yields per bioreactor volume, increased flexibility and more consistent product quality. But to achieve this, the system and the process need to be set up very carefully. Unlike batch-fed systems, perfusion systems accumulate no waste products. Expressed proteins can rapidly be removed and made available for purification—a significant advantage with proteins prone to instability.

Removing spent media while keeping cells in culture can be done using different technologies like filtration, e.g. alternating tangential-flow (ATF) and standard tangential-flow filtration (TFF). Other methods include use of sedimentation devices, centrifuges or an acoustic device. Another option is to retain the cells by binding them to a substrate (capillary fibers, membranes, microcarriers in fixed bed, and so on) in the bioreactor. A review about perfusion cell culture providing details about favorable set ups can be found in "Perfusion mammalian cell culture for recombinant protein manufacturing—A critical review" Jean-Marc Bielser et al., Biotechnology Advances 36 (2018) 1328-1340. A filtration based perfusion system in which dead cells can only be removed from the system through bleeding is described in "Potential of Cell Retention Techniques for Large-Scale High-Density Perfusion Culture of Suspended Mammalian Cells", D. Voisard, F. Meuwly, P.-A. Ruffieux, G. Baer, A. Kadouri, *Cytotechnology* 28: 163-175, 1998.

In some perfusion processes, ultrafiltration membranes are used to retain the product in the bioreactor. Those processes are also called "concentrated fed-batch" or CFB. Concentrated fed-batch cell culture increases manufacturing capacity without additional volumetric capacity. Information about this special perfusion process can be found in William C. Yanga,*, Daniel F. Minklera, Rashmi Kshirsagarb, Thomas Ryllb,Yao-Ming Huanga, Journal of Biotechnology 217 (2016) 1-11.

BRIEF DESCRIPTION OF THE DRAWINGS

FIG. 1 shows a schematic view of a state of the art perfusion cell culture bioreactor. The bioreactor (1) with the cell culture (2) including the liquid cell culture medium and the cells is optionally stirred by stirrer 3. New, fresh medium can be added via Q—in, also called P. The harvest stream including cells, liquid medium and target product leaves the bioreactor (1) via the Q-harvest line. Q harvest is often called H. A cell retention device (4) retains the cells e.g. by the methods described above so that cell free or cell-reduced harvest can be collected. Typically, in perfusion cell culture, media is fed continuously via Q—in and harvest is removed continuously via Q-harvest.

Figure 1:
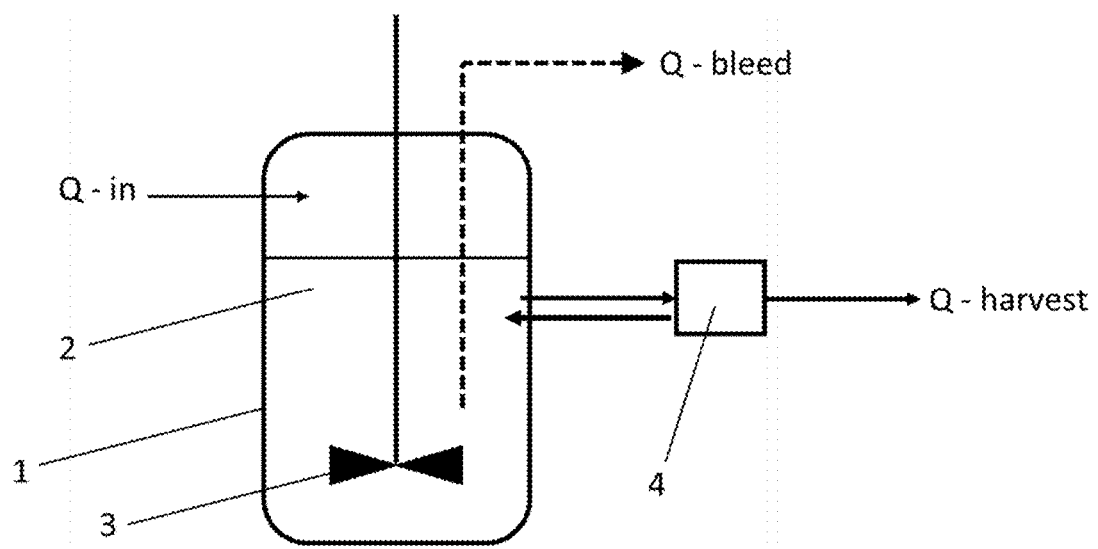
FIG. 1 shows a schematic view of a state of the art perfusion cell culture bioreactor.

Once the cell density has reached a desired set-point excess cells need to be removed to keep a steady cell concentration and a achieve steady-state operation. This is done via the bleed stream Q-bleed, also called B. This stream includes a liquid and a solid part, it is a suspension. The solid part includes viable and non-viable cells, the liquid part includes the liquid cell culture medium as well as waste components and the target product present in the liquid. To maintain a constant volume in the bioreactor, typically Q—in=Q-harvest+Q-bleed, also called P=H+B, meaning that the volume of cell culture medium that is newly added to the bioreactor via Q—in needs to be equivalent to the volume that is removed via Q-harvest and Q-bleed.

As for example discussed in Jean-Marc Bielser et al., Biotechnology Advances 36 (2018) 1328-1340, this bleed stream is wasted with no recovery of the target product. Consequently, in order to maximize the process yield, the bleed stream rates are typically minimized. Nevertheless, the performance and yield of a process depend on the different flowrates. An increased perfusion rate generally enables the generation of more biomass and thus more target product. The faster the cells grow, the larger is the bleed rate leading to a loss in the yield. Stable operation is therefore often defined in a range where the cell density is large enough to achieve an economically viable productivity, but in a state where cell growth is controlled either by nutrient limitation or other environmental factors to minimize the bleed rate.

It would thus be favorable to find a way to allow not only an economic cell density but a high, more productive cell density. It has been found that this is possible by inserting in the bioreactor system a bleed recovery device. With this device the bleed that needs to be removed from the bioreactor to remove excess viable and non-viable cells, but that always also contains target product, is first separated in a solid fraction comprising mainly cells and a liquid fraction comprising the liquid with the target product. The liquid fraction can then be directed back into the bioreactor or it can be directed to the harvest stream. With this, the main part of the target product present in the bleed is not wasted but can be recovered. This leads to higher process yields and enables an additional degree of freedom in process optimization since there is no longer a need to limit the bleed stream to reduce the loss of target product. The bleed stream can rather be enlarged if this is favorable for a higher product yield.

The present invention is thus directed to a bioreactor system comprising a bioreactor with a media inlet and a harvest outlet, typically including a cell retention device, whereby the bioreactor additionally comprises a bleed recovery device with an inlet for the bleed, a means for separating the cells of the bleed from the liquid part of the bleed, and an outlet, the inlet leading the bleed from the bioreactor to the means for separating the cells of the bleed from the liquid part of the bleed and outlet for leading the liquid part of the bleed to the bioreactor and/or the harvest. Cells accumulate over time and several cycles in the bleed recovery device. Therefore, flexible containers are preferred. A withdrawal of cell slurry between cycles is also possible.

In a preferred embodiment the means for separating the cells of the bleed from the liquid part of the bleed is a container or a bag.

In a preferred embodiment, the system additionally comprises a pump for controlling the fluid stream of the bleed into the bleed recovery device and especially into the means for separating the cells of the bleed from the liquid part of the bleed, and a pump for controlling the stream of the liquid part of the bleed out of the means for separating the cells of the bleed from the liquid part of the bleed through the outlet of the bleed recovery device back into the bioreactor and/or into the harvest outlet.

In the simplest case, one line or tube, one pump and one container are sufficient to achieve bleed recovery. However, additional tubes and pumps may increase the bleed recovery device's efficiency. In one embodiment, two separate settling containers, utilized alternatingly, are present which allow quasi-continuous operation.

In a preferred embodiment, the system additionally comprises a process management system.

In a preferred embodiment, the inlet of the bleed recovery device is a tube, preferably a sealable plastic tube. The sealing of the tube can be done by the pumps, by valves or other locking mechanisms.

In a preferred embodiment, the outlet of the bleed recovery device is a tube, preferably a sealable plastic tube. The sealing of the tube can be done by the pumps, by valves or other locking mechanisms.

In a preferred embodiment, the outlet of the bleed recovery device leads into the bioreactor. Preferably it enters the bioreactor at a submers position, that means a position below the surface of the medium and cell suspension.

In another preferred embodiment, the means for separating the cells of the bleed from the liquid part of the bleed is a container for sedimentation of the cells.

In a preferred embodiment, the outlet of the bleed recovery device is connected to the container for sedimentation of the cells at the side opposite to the connection with the inlet and in the upper half of said side.

In a very preferred embodiment, the container for sedimentation of the cells is a flat container with the smallest dimension being its height that is positioned horizontally.

In a very preferred embodiment, the flat container is a plastic bag.

The present invention is also directed to a process for perfusion cell culture, comprising culturing cells in a bioreactor system comprising a bioreactor with a media inlet and a harvest outlet and a bleed recovery device with an inlet for the bleed leading the bleed from the bioreactor to a means for separating the cells of the bleed from the liquid part of the bleed and an outlet for directing the liquid part of the bleed from the means for separating the cells of the bleed from the liquid part of the bleed back to the bioreactor or to the harvest outlet whereby i. continuously or one or several times during the cell culture process new cell culture medium is inserted into the bioreactor via the media inlet ii. continuously or one or several times during the cell culture process harvest is removed from the bioreactor via the harvest outlet iii. continuously or one or several times during the cell culture process a certain amount of bleed is removed from the bioreactor via the inlet of the bleed recovery device and directed to the means for separating the cells of the bleed from the liquid part of the bleed, separating the cells from the liquid part and transferring the liquid part through the outlet of the bleed recovery device back to the bioreactor and/or into the harvest outlet.

In a preferred embodiment, in iii the liquid part of the bleed that is transferred back to the bioreactor and/or into the harvest outlet comprises more than 70% preferably more than 80% of the liquid comprised in the bleed removed from the bioreactor and less than 10%, preferably less than 5%, e.g. between 1 and 5%, for example around 1%, around 2%, around 3% or around 4%, of the cells comprised in the bleed removed from the bioreactor.

In a preferred embodiment, iii is performed by one or several times during the cell culture process removing a certain amount of bleed from the bioreactor via the inlet of the bleed recovery device and directing it to the means for separating the cells of the bleed from the liquid part of the bleed comprising a container, for some time allowing the bleed to settle in said container so that the cells settle towards the ground of said container, after that time removing the liquid supernatant above the settled cells that is reduced in cells through the outlet of the bleed recovery device back to the bioreactor and/or into the harvest outlet.

In a preferred embodiment, the time for which the bleed is allowed to settle in the container is between 30 minutes and 2 hours.

In a preferred embodiment, the process steps i, ii and iii are regulated such that the volume of the cell culture in the bioreactor is kept at a constant level. Furthermore, through advanced control of the flow rates B and H, P can remain constant, which is considered a prerequisite for steady-state perfusion operation.

A schematic view of a perfusion bioreactor system according to the state of the art can be found in FIG. 1.

Figure 2:
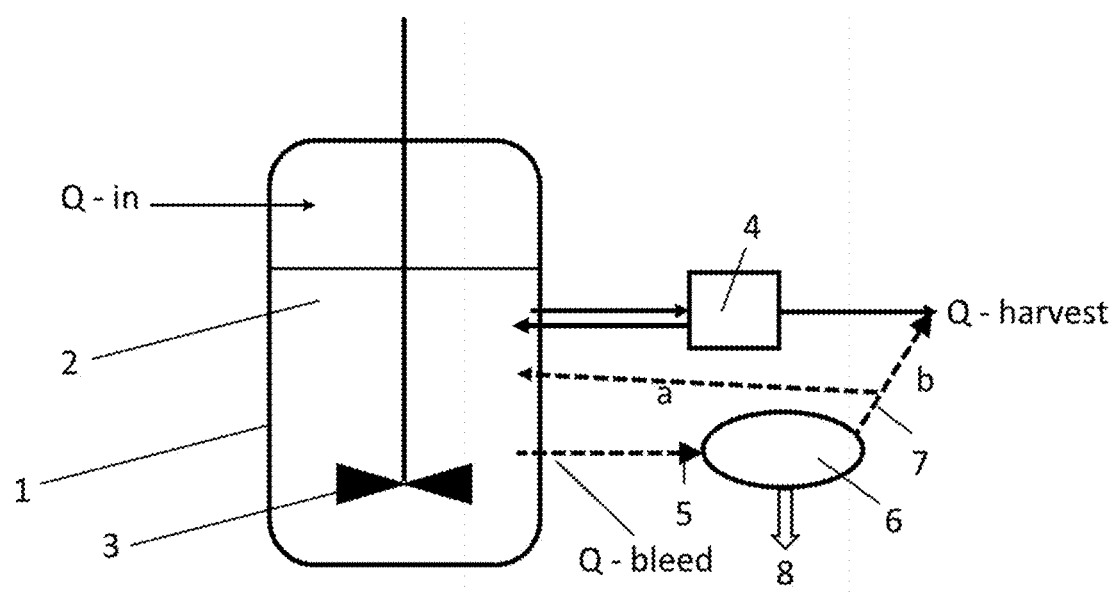
FIG. 2 shows a schematic view of a perfusion bioreactor system comprising a bleed recovery device according to the present invention.

A schematic view of a perfusion bioreactor system comprising a bleed recovery device according to the present invention is shown in FIG. 2.

Figure 3:
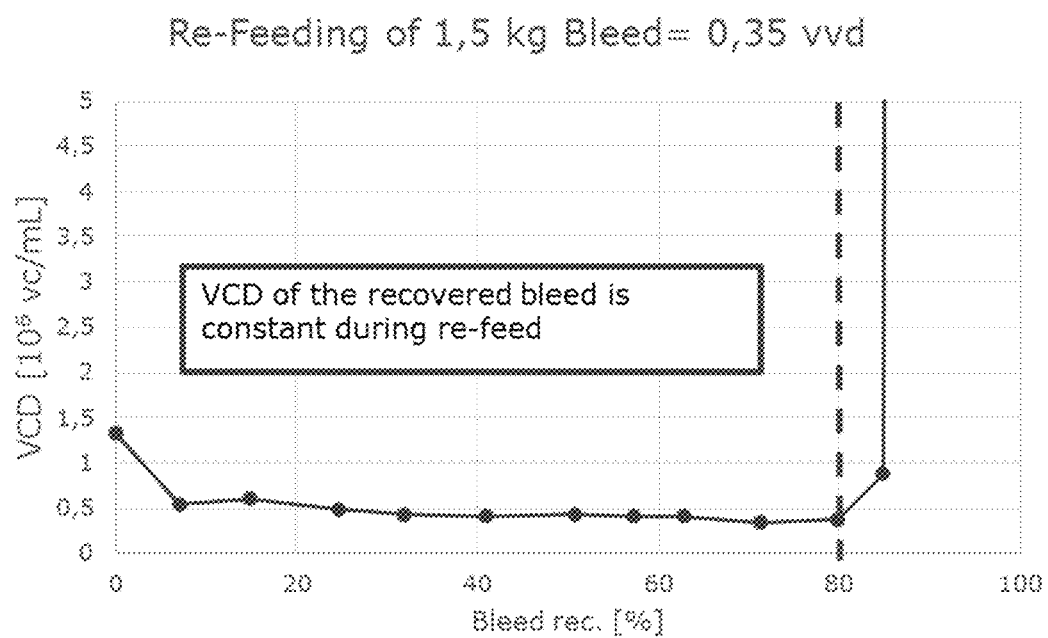
FIG. 3 shows the viable cell density of the liquid part of the bleed that is re-fed after sedimentation of the cells from the bleed recovery device into the bioreactor.

FIG. 3 shows the viable cell density of the liquid part of the bleed that is re-fed after sedimentation of the cells from the bleed recovery device into the bioreactor.

Figure 4:
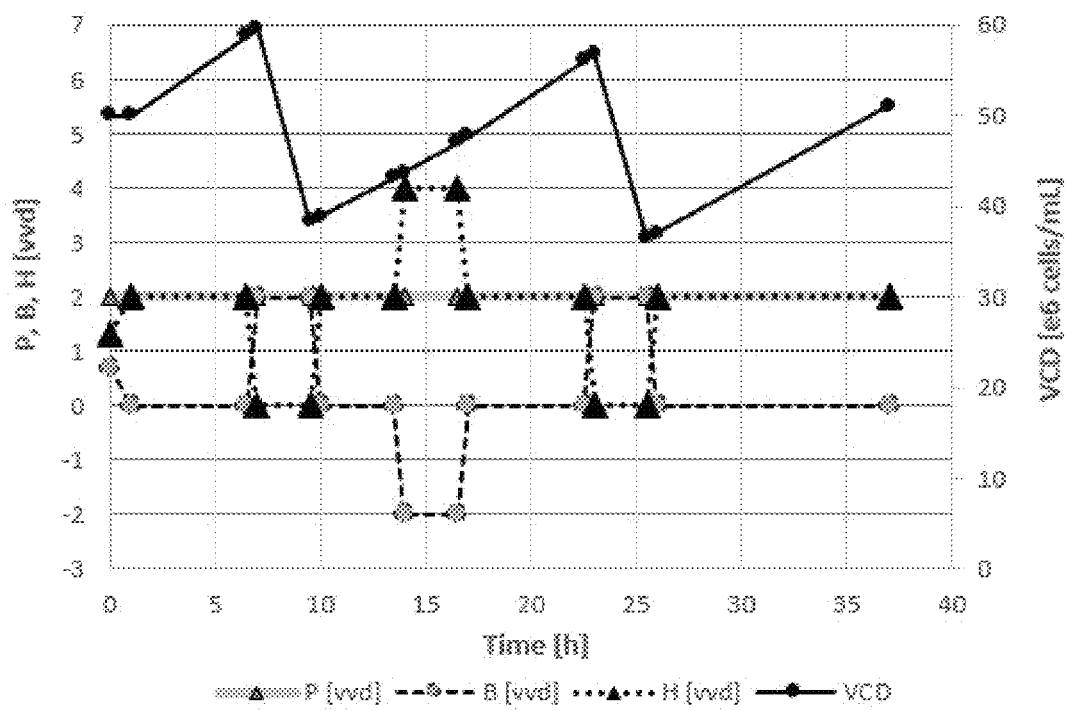
FIG. 4 shows the scheme of exemplary flow rates for a perfusion process with 2vvd according to the present invention.
Figure 5A:
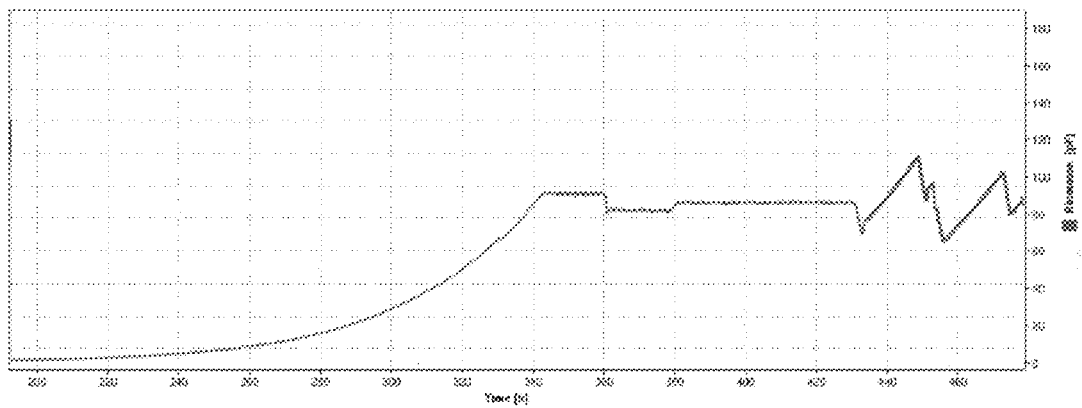
FIG. 5A shows phase 1 of the bleed recovery operation in steady-state perfusion from Example 3.
Figure 5B:
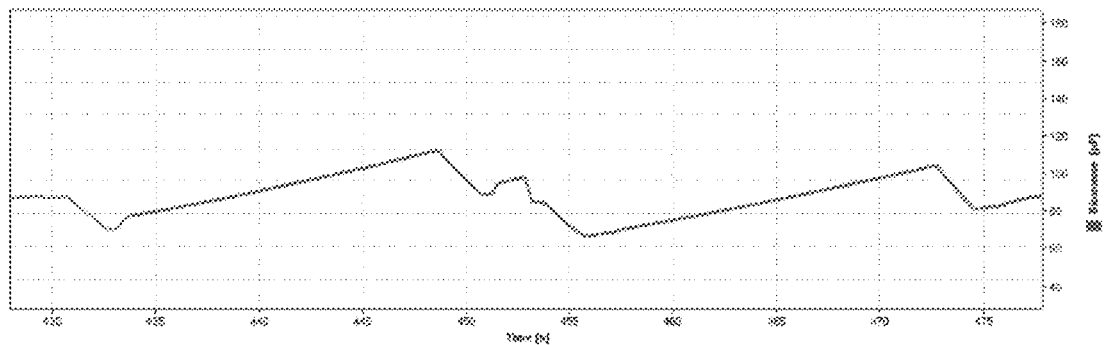
FIG. 5B shows phase 2 of the bleed recovery operation in steady-state perfusion from Example 3.

FIG. 4 shows the scheme of exemplary flow rates for a perfusion process with 2 vvd according to the present invention.

Details about FIGS. 5 to 11 can be found in the Examples.

A cell culture is any setup in which cells are cultured.

A cell culture is typically performed in a bioreactor.

A bioreactor is any container suitable for the culture of cells, such as a bottle, tube, vessel, bag, flask and/or tank. Typically, the container is sterilized prior to use. A cell culture is typically performed by incubation of the cells in an aqueous cell culture medium under suitable conditions for growth and/or maintenance of the cells such as suitable temperature, pH, osmolality, aeration, agitation, etc. which limit contamination with foreign microorganisms from the environment. A person skilled in the art is aware of suitable incubation conditions for culturing of cells. A bioreactor used according to the present invention is preferably a bioreactor suitable for perfusion cell culture.

A bioreactor system suitable to be used in the present invention comprises the bioreactor and additional equipment that is necessary to run a perfusion cell culture in said bioreactor like one or more of the following
- devices for stirring
- devices for supply and discharge of components to and from the bioreactor, e.g. tubes, pumps, valves, storage tanks
- a cell retention device (see above)
- a system for monitoring bioreactor volume, e.g. a bioreactor balance, level sensors etc.
- devices for controlling and maintaining temperature, osmolality, aeration, agitation, etc.
- a computer system for automated or partially automated operation of the cell culture bioreactor A cell culture medium (synonymously used: culture medium) according to the present invention is any mixture of components which maintains and/or supports the in vitro growth of cells and/or supports or maintains a particular physiological state.

It might comprise undefined components, such as plasma, serum, embryo extracts, or other non-defined biological extracts or peptones. It might also, preferably, be a chemically defined medium. The cell culture medium can comprise all components necessary to maintain and/or support the in vitro growth of cells or be used for the addition of selected components in combination with or not in combination with further components that are added separately (media supplement). The components of a cell culture medium are also called cell culture media ingredients.

The cell culture devices and processes according to the present invention are designed to be suitable to grow or maintain/support the growth of prokaryotic cells like bacterial cells as well as eukaryotic cells like yeast, fungi, algae, plant, insect and/or mammalian cells and, optionally, archaea. Preferred cells are mammalian cells.

Chemically defined cell culture media are cell culture media comprising of chemically well characterized 'defined' raw materials. This means that the chemical composition of all the chemicals used in the media is known. The chemically defined media do not comprise of chemically ill-defined substances like chemically ill-defined yeast, animal or plant tissues; they do not comprise peptones, feeder cells, serum, ill-defined extracts or digests or other components which may contribute chemically poorly defined proteins and/or peptides and/or hydrolysates to the media. In some cases the chemically defined medium may comprise proteins or peptides which are chemically defined—one example is insulin (see others below).

A liquid cell culture medium is typically produced by dissolving a powdered cell culture medium in a suitable liquid.

A powdered cell culture medium or a dry powder medium or a dehydrated culture medium is a cell culture medium typically resulting from a milling process or a lyophilisation process. That means the powdered cell culture medium is typically a finely granular, particulate medium—not a liquid medium. The term "dry powder" may be used interchangeably with the term "powder;" however, "dry powder" as used herein simply refers to the gross appearance of the granulated material and is not intended to mean that the material is completely free of complexed or agglomerated solvent unless otherwise indicated. A powdered cell culture medium can also be a granulated cell culture medium, e.g. dry granulated by roller compaction or wet granulated by fluidized bed spray granulation. Such a medium can also be prepared by spray drying.

Solvents, also called liquids, used to prepare a liquid cell culture medium are typically water (most particularly distilled and/or deionized water or purified water or water for injection or water purified by reverse osmosis (Milli-Q®))) or an aqueous buffer. The solvent may also comprise saline, soluble acid or base ions providing a suitable pH range (typically in the range between pH 1 and pH 10), stabilizers, surfactants, preservatives, and alcohols or other polar organic solvents.

The pH of the dissolved medium prior to addition of cells is typically between pH 2 and 12, more preferable between pH 4 and 10, even more preferably between pH 6 and 8 and most preferable between pH 6.5 to 7.5 and ideally between pH 6.8 to 7.3.

A cell culture medium which comprises all components necessary to maintain and/or support the in vitro growth of cells typically comprises at least one or more saccharide components, one or more amino acids, one or more vitamins or vitamin precursors, one or more salts, one or more buffer components, one or more co-factors and one or more nucleic acid components (nitrogenous bases) or their derivatives. It may also comprise chemically defined biochemicals such as recombinant proteins, e.g. rInsulin, rBSA, rTransferrin, rCytokines etc.

The media may also comprise sodium pyruvate, highly purified and hence chemically well-defined extracts, fatty acids and/or fatty acid derivatives and/or poloxamer product components (block copolymers based on ethylene oxide and propylene oxide) in particular Poloxamer 188 sometimes called Pluronic F 68 or Kolliphor P 188 or Lutrol F 68 and/or surface active components such as chemically prepared non-ionic surfactants. One example of a suitable non-ionic surfactants are difunctional block copolymer surfactants terminating in primary hydroxyl groups also called poloxamers, e.g. available under the trade name Pluronic® from BASF, Germany. Such poloxamer product components are in the following just called poloxamer or pluronic. Chelators, hormones and/or growth factors may also be added.

Other components it may comprise of are the pure compounds, salts, conjugates, and/or derivatives of lactic acid, thioglycollic acid, thiosulphates, tetrathionate, diaminobutane, myo-inositol, phosphatidylcholine (lecithin), sphingomyelin, iron containing compounds (including compounds with iron sulphur clusters), uric acid, carbamoyl phosphate, succinic acid, thioredoxin(s), orotic acid, phosphatidic acid, polyamines (such as putrescine, spermidine, spermine and/ or cadaverine), triglycerides, steroids (including but not limited to cholesterol), metallothionine, oxygen, glycerol, urea, alpha-ketoglutarate, ammonia, glycerophosphates, starch, glycogen, glyoxylate, isoprenoids, methanol, ethanol, propanol, butanol, acetone, lipids (including but not limited to those in micelles), tributyrin, butyrin, cholic acid, desoxycholic acid, polyphosphate, acetate, tartrate, malate and/or oxalate.

Saccharide components are all mono- or di-saccharides, like glucose, galactose, ribose or fructose (examples of monosaccharides) or sucrose, lactose or maltose (examples of disaccharides) or derivatives thereof like sugar alcohols. Saccharide components may also be oligo- or polysaccharides.

Examples of amino acids according to the invention are particularly the proteinogenic amino acids, especially the essential amino acids, leucine, isoleucine, lysine, methionine, phenylalanine, threonine, tryptophan and valine, as well as the non-proteinogenic amino acids such as D-amino acids.

Tyrosine means L- or D-tyrosine, preferably L-tyrosine.
Cysteine means L- or D-cysteine, preferably L-cysteine.
Amino acid precursors and analogues are also included.

Examples of vitamins are Vitamin A (Retinol, retinal, various retinoids, and four carotenoids), Vitamin $B_1$ (Thiamine), Vitamin $B_2$ (Riboflavin), Vitamin $B_3$ (Niacin, niacinamide), Vitamin $B_5$ (Pantothenic acid), Vitamin $B_6$ (Pyridoxine, pyridoxamine, pyridoxal), Vitamin $B_7$ (Biotin), Vitamin $B_9$ (Folic acid, folinic acid), Vitamin $B_{12}$ (Cyanocobalamin, hydroxycobalamin, methylcobalamin), Vitamin C (Ascorbic acid) (including phosphates of ascorbic acid), Vitamin D (Ergocalciferol, cholecalciferol), Vitamin E (Tocopherols, tocotrienols) and Vitamin K (phylloquinone, menaquinones). Vitamin precursors and analogues are also included.

Examples of salts are components comprising inorganic ions such as bicarbonate, calcium, chloride, magnesium, phosphate, potassium and sodium or trace elements such as Co, Cu, F, Fe, Mn, Mo, Ni, Se, Si, Ni, Bi, V and Zn. Examples are copper(II) sulphate pentahydrate ($CuSO_4 \cdot 5 H_2O$), sodium chloride (NaCl), calcium chloride ($CaCl_2 \cdot 2 H_2O$), potassium chloride (KCl), iron(II) sulphate, sodium phosphate monobasic anhydrous ($NaH_2PO_4$), magnesium sulphate anhydrous ($MgSO_4$), sodium phosphate dibasic anhydrous ($Na_2HPO4$), magnesium chloride hexahydrate ($MgCl_2 \cdot 6 H_2O$), zinc sulphate heptahydrate ($ZnSO_4 \cdot 7 H_2O$).

Examples of buffers are carbonate, citrate, phosphate, HEPES, PIPES, ACES, BES, TES, MOPS and TRIS.

Examples of cofactors are compounds, salts, complexes and/or derivatives of thiamine, biotin, vitamin C, calciferol, choline, NAD/NADP (reduced and/or oxidized), cobalamin, vitamin B12, flavin mononucleotide and derivatives, flavin adenine dinucleotide and derivatives, glutathione (reduced and/or oxidized and/or as dimer), haeme, haemin, haemoglobin, ferritin, nucleotide phophates and/or derivatives (e.g. adenosine phosphates), coenzyme F420, s-adenosyl methionine, coenzyme B, coenzyme M, coenzyme Q, acetyl Co-A, molybdopterin, pyrroloquinoline quinone, tetrahydrobiopterin.

Nucleic acid components are the nucleobases, like cytosine, guanine, adenine, thymine, uracil, xanthine and/or hypoxanthine, the nucleosides like cytidine, uridine, adenosine, xanthosine, inosine, guanosine and thymidine, and the nucleotides such as adenosine monophosphate or adenosine diphosphate or adenosine triphosphate, including but not limited to the deoxy- and/or phosphate derivatives and/or dimers, trimers and/or polymers thereof, like RNA and/or DNA.

Components may be added which improve the physicochemical properties of the media, like but not limited to, increasing clarity and/or solubility of the media and/or one or more of its components, without significantly negatively affecting the cell growth properties at the concentrations used. Such components include but are not limited to chelating agents (e.g. EDTA), antioxidants, detergents, surfactants, emulsifiers (like polysorbate 80), neutralising agents, (like polysorbate 80), micelle forming agents, micelle inhibiting agents and/or polypropylene glycol, polyethylene alcohol and/or carboxymethylcellulose.

The terms "cell density," "viable cell density" and "cell concentration," as used herein, refer interchangeably to the number of metabolically active cells per unit volume of a cell culture.

The terms "perfusion" or "perfusion process" refers to a cell culture process used to produce a target product, e.g., an antibody or recombinant protein, in which a high concentration of cells within a bioreactor receive fresh growth medium continually or one or more times during cell culture whereby the spent medium which may contain a target product is harvested, which means removed from the bioreactor continually or one or more times during cell culture. Preferably, fresh growth medium is continually fed into the bioreactor and spent medium which may contain the target product is harvested continually.

The cells to be cultured in the system and the process of the present invention can in particular be cells capable of expressing target products, e.g. therapeutic biomolecules, such as immunoglobulins (e.g. monoclonal antibodies or antibody fragments), fusion proteins, coagulation factors, interferons, insulin, growth hormones or other recombinant proteins. Such cells can e.g. be CHO cells, Baby hamster kidney (BHK) cells, PER.C.6 cells, myeloma cells, HEK cells etc.

A "steady-state" is typically a stable condition that does not change over time or in which change in one direction is continually balanced by change in another. In perfusion, a steady state can be defined by a "constant viable cell density". A constant viable cell density combined with a constant perfusion rate results in a constant cell-specific perfusion rate (CSPR), which is generally considered a critical criterion to achieve steady-state.

Typically, for performing a perfusion cell culture a small number of cells and a liquid cell culture medium are introduced in the bioreactor and the cultivation conditions are selected such that the cells divide and thus produce an increasing cell density, while expressing the target product. The cultivation can be performed according to methods known in the art, involving e.g. a suitable extent of agitation, addition of oxygen/air, removal of $CO_2$ & and other gaseous metabolites etc. During cultivation, various parameters, such as e.g. pH, conductivity, metabolite concentrations, cell density etc. can be controlled to provide suitable conditions for the given cell type. The cell density can suitably be increased to a level where the cell concentration in the bioreactor is at least 1 million cells per ml, preferably at least 10 million cells per ml, typically between 10 million and 250 million cells per ml. The upper limit will mainly be set by the rheological properties of the cell suspension at very high cell densities, where agitation and gas exchange can be hampered when paste-like consistencies are approached. Other limitations to perfusion processes might prevent the operator from achieving this physical limit, e.g. maximum cell retention device flow rate, maximum bioreactor oxygen transfer rate, limitation in product stability, and the lowest cell-specific perfusion rate (CSPR) that the medium allows. The cell viability can e.g. be at least 50%, such as at least 80% or at least 90%.

The concentration of a target product expressed by the cells in the bioreactor can be at least 0.1 g/l or at least 2 g/l. Typically it is between 0.1 and 5 g/l but in some processes like CFB, where the product is not harvested but retained in the bioreactor, product concentrations up to 10 to 30 g/l can be achieved.

An exemplary bioreactor suitable for perfusion cell culture comprises a cell retention device to keep the cells in the bioreactor during harvesting. This cell retention device can be acoustic, alternating tangential flow (ATF), a settler, a centrifuge, and the like. In some examples, disposable, reusable or semi-disposable bioreactors may be used. Any combination of hardware design may be used. In one example, a disposable cell retention device may be used. In some embodiments, disposable conduits, tubing, pumps, bag assemblies and cell retention devices are used instead of hard piping and reusable devices.

The bioreactor of the bioreactor system of the present invention may have any suitable volume including, but not limited to, about 1 L to about 2000 L, but are not limited to this exemplary range. Certain exemplary bioreactor volumes include, but are not limited to, about 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 500, 1000, 1500 L, any intermediate volumes, and the like.

An exemplary bioreactor may have any suitable minimum and maximum working volumes depending, for example, on the total vessel volume, the ratio between the height and diameter of the vessel, the vessel configuration (e.g., whether the bioreactor is a bag bioreactor), the growth rate, and the like. For example, in a 5 L bioreactor, an exemplary minimum working volume may range from about 100 mL to about 1 L, and an exemplary maximum working volume may range from about 3.5 L to about 5 L. In a 20 L bioreactor, an exemplary minimum working volume may range from about 100 mL to about 5 L, and an exemplary maximum working volume may range from about 15 L to about 19 L. In a 200 L bioreactor, an exemplary minimum working volume may range from about 20 mL to about 50 L, and an exemplary maximum working volume may range from about 150 L to about 190 L. One of ordinary skill in the art will recognize that the above numerical values and ranges are illustrative and not intended to limit the scope of the invention.

The bioreactor may include one or more inlets, also called inlet ports, for the introduction of one or more feeds (e.g., cell culture medium), chemical substances (e.g., pH buffers), anti-foam agents, and the like. It may also include one or more outlets, also called outlet ports, for the removal of cells and/or liquid from the bioreactor. Each inlet and/or outlet in the bioreactor may be provided with any suitable mechanism for initiating and conducting fluid flow through the inlet and/or outlet including, but not limited to, one or more peristaltic pumps, one or more pressurization mechanisms, and the like. Each inlet and/or outlet may be provided with any suitable mechanism for monitoring and controlling fluid flow through the inlet including, but not limited to, one or more mass flow meters, one or more flow control valves, and the like. For example, the bioreactor may include a flow control mechanism to control the flow rate of substances into and out of the bioreactor.

The bioreactor may also comprise means for volume and/or level control.

The bioreactor comprises a media inlet, that may be operated at discrete times or continuously to introduce new cell culture medium into the cell culture. The bioreactor comprises one or more harvest outlets for releasing spent cell culture, cells and/or target products. A harvest outlet may comprise a flow control valve to control the rate of harvest. In one embodiment, the harvest may be stored in a harvest bottle or container.

The bioreactor system of the present invention additionally comprises a bleed recovery device. A flow control valve may be provided at its inlet to control the bleed rate and the duration of the bleed extraction.

In one embodiment the bioreactor and/or the means (6) (FIG. 2) of the bleed recovery device is a flexible, nonporous plastic bag, e.g. made of a flexible polymer, e.g. polyethylene material or film. Typically, the bag has fitments attached to it. The term "fitment" as used herein refers to a separate object that is welded, e.g. heat welded, to the nonporous bag film in order to attach it. As such, a fitment often comprises a polymeric material which can be the same or similar to the polymeric material comprising the wall of the nonporous bag. A fitment is often a more dense material than the wall of the nonporous bag, and may be added to the bag to enable a functionality. A non-limiting example of a fitment is one that forms an inlet or an outlet. In a preferred embodiment of the invention, the nonporous bag comprises at least one in- and outlet in the wall of the nonporous bag in order to add or withdraw liquid or cells from the bag, whereby it might be a combined in- and outlet or a separate inlet and a separate outlet. The bag might also comprise more than one inlets and/or more than one outlets. In case of the means (6) of the bleed recovery device the bag preferably comprises one inlet and one or two outlets.

Typically, a tubing is attached to the inlet and/or outlet.

In various embodiments of the invention the nonporous bag of the bleed recovery device is a two dimensional disposable bag comprising a top panel and a bottom panel, or a three dimensional disposable bench top bioreactor bag, or a disposable bioreactor bag for use with a support structure. The nonporous bag can be any size, for example, having an internal volume of 1 liter, 10 liters, 100 liters, 200 liters, 500 liters, or 5000 liters.

The tubing is typically a flexible or non-flexible tubing made of plastic or metal. Preferably it is a flexible plastic tubing. The diameter and length of the tubing depends on the size of the bioreactor system. Typically, the inner diameter of the tubing is between 2 and 50 mm, typically between 2 and 30 mm.

Typically the bioreactor system also comprises pumps and valves attached via the tubing. The pumps are for transport of liquids or suspensions or cell slurries from the bioreactor e.g. to the harvest or the bleed recovery device or for transport of liquids or suspensions or cell slurries from e.g. the harvest or the bleed recovery device to the bioreactor or other locations. Examples of suitable pumps are peristaltic pumps, magnetically coupled pumps, membrane pumps, etc.

The valves are positioned such that they can hinder, allow or direct the flow of e.g. a liquid, cell suspension or cell slurry. Examples of suitable valves are e.g. solenoid valves or pinch valves.

The bioreactor system may include one or more sensors or probes for detecting one or more operational parameters in real-time including, but not limited to, a state of inlet ports, a state of outlet ports, a state of a multi-way manifold, a capacitance probe, a cell culture volume sensor, a cell culture bioreactor weight sensor, a liquid level sensor, a thermometer, a pH probe, an oxygen probe, a lactic acid probe, an ammonia probe, a rate of agitation sensor, a metabolic flux sensor, a metabolic rate sensor, a perfusion rate sensor, a carbon monoxide sensor, mass spectrometry, gas chromatography, combinations thereof, and the like. These sensors may detect one or more operational parameters including, but not limited to, a viable cell density (using the capacitance probe or any alternative method providing online measurements of cell density), a cell culture volume, a cell culture weight, a cell culture liquid level, a temperature, a pH, dissolved oxygen, agitation rate, metabolic flux, metabolic rate, a perfusion rate of a perfusion device, oxygen uptake rate, carbon dioxide production (e.g., using gas chromatography, mass spectrometry), lactic acid levels, ammonia levels, combinations thereof, and the like. The bioreactor may also comprise soft sensors.

The bioreactor and its inlet ports, outlet ports and the like may be coupled to one or more process management systems configured or programmed to perform multivariate analysis of sensor data and to automatically control operation of the bioreactor in real-time based on the analysis. The process management system may control operation by, for example, opening/closing a port of an inlet or an outlet, changing the state of a multi-way manifold, changing a rate of perfusion of the bioreactor system, changing a rate of agitation of the cell culture, a temperature, a pH, a level of dissolved oxygen, combinations thereof, and the like.

The bleed recovery device comprises an inlet for the bleed leading the bleed from the bioreactor into the means for separating the cells of the bleed from the liquid part of the bleed and an outlet for the liquid part of the bleed leading from the means for separating the cells of the bleed from the liquid part of the bleed to the bioreactor and/or the harvest outlet. Harvest outlet in this case means any part of the harvest outlet, e.g. a tube or a harvest container. The bleed recovery device can be made of soft or hard material like metal or preferably plastic forming a defined, closed sterile volume.

A schematic view of a perfusion bioreactor system comprising a bleed recovery device according to the present invention is shown in FIG. 2.

The bioreactor (1) with the cell culture (2) including the liquid cell culture medium and the cells are optionally agitated by stirrer (3). New, fresh medium can be added via Q—in. The harvest stream including cells, liquid medium and target product leaves the bioreactor (1) via the Q-harvest line. A cell retention device (4) retains the cells e.g. by the methods described above so that cell free harvest can be collected, and the cells are retained in the bioreactor. The bleed that shall be removed from the bioreactor is extracted therefrom via Q-bleed and led into the means for separating the cells of the bleed from the liquid part of the bleed (6) via the inlet (5) leading the bleed from the bioreactor into said means (6). In the means (6) the cells of the bleed are separated from the liquid part of the bleed, e.g. by sedimentation, acoustic means, filtration or centrifugation, preferably by sedimentation. Sedimentation in this case means the separation of a suspension of cells into a concentrated slurry of cells and a cell-free or cell-reduced supernatant liquid by letting the cells settle due to gravity. The supernatant liquid typically comprising liquid cell culture medium, waste and target product is removed from means (6) via outlet (7). From outlet (7) it might then either be directed back into the bioreactor (according to route a) or to the harvest outlet (according to route b). For bleed recovery, route a) is of course preferred. Optionally, the means for separating the cells of the bleed from the liquid part of the bleed (6) also comprises an outlet (8) through which the slurry of cells can be removed and transferred to waste. In a preferred embodiment, the outlet (7) for the liquid is positioned such that only the liquid supernatant is removed via this outlet. This is for example done by positioning the outlet in height so that it is above the height of the settled cells. The outlet (7) can also comprise a filter or equivalent means to keep the cells from flowing through the outlet (7). Preferably, outlet (7) is positioned at a position in means (6) which is as distant as possible from inlet (5) and which is located in the upper half of the means (6) so that when removing the liquid supernatant from means (6) through outlet (7) the settled cells are not disturbed or taken with by the liquid stream. Preferably outlet (7) leads back into the bioreactor.

Outlet (8) on the other hand is an optional outlet designed for the removal of the settled cells. Either after each separation of a bleed portion into the liquid supernatant part and the cells or once the amount of settled cells in means (6) is such that no further suspension coming from the bioreactor can be inserted into means (6), the settled cells are removed from means (6) via outlet (8). Preferably outlet (8) is positioned at the bottom of means (6) to enable easy removal of the cell slurry via gravity. It is of course also possible to remove the cells by other means via an outlet which is positioned differently. The bleed recovery device may also comprise sensors or probes for determining the cell density. The cell density in the inlet is typically the cell density of the bioreactor but the cell density at the outlet is much lower as ideally as less cells as possible shall be transferred back to the bioreactor. A sensor for cell density can indicate if the bleed recovery device might be too full or sedimentation of the cells does not work properly so that too many cells are transferred back to the bioreactor.

The inlet (5) as well as the outlets (7) and (8) typically comprise a tubing with a valve and/or a pump. Inlet and outlet are preferably positioned submers in the bioreactor.

In one embodiment the bleed recovery device comprises two means (6) both independently connected to the inlet and the outlet. It typically also comprises at least one pump or valve which can direct the flow of the suspension coming from the bioreactor through the inlet into one of the means (6) and directing the liquid supernatant from one of the means (6) back into the bioreactor and/or into the harvest. If two or more means (6) are present the bleed recovery can be performed by quasi-continuously alternatingly loading the two or even more means (6). While one means (6) is loaded with new cell suspension coming from the bioreactor, the cells in the other means (6) can settle and afterwards the liquid supernatant can be directed back into the bioreactor and/or into harvest.

In one embodiment, the inlet and the outlet of the bleed recovery device are identical. In this case, which is the most simple set-up, the bleed recovery device is connected to the bioreactor via only one tube which is at the same time the inlet and the outlet. A pump and/or a valve are used to direct the flow. First the pump pumps bleed from the bioreactor into the bleed recovery device. Then the cells are allowed to settle in the container (means 6) of the bleed recovery device. Afterwards the liquid supernatant is pumped back into the bioreactor. This can be done several times until the container of the bleed recovery device is too full with cells to allow for effective settling of the cells and for removing the supernatant.

In cases like the above when the bleed recovery device is meant to be filled with new bleed several times without removing the settled cells, a flexible plastic bag is the preferred type of container.

The bleed recovery device of the present invention can be distinguished from other inlet or outlet systems like harvest by the outlet leading back to the bioreactor. The outlet might also lead to harvest but very preferably one outlet leads back into the bioreactor. In a preferred embodiment the bleed recovery device is not connected to any other inlets and outlets or tubings of the bioreactor system but it only has an inlet and outlet leading from and to the bioreactor, preferably it has at least one pump for directing the flow into and from the bleed recovery device.

The present invention is also directed to a process for perfusion cell culture, comprising culturing cells in a bioreactor system comprising a bioreactor with a media inlet and a harvest outlet and a bleed recovery device with an inlet for the bleed leading the bleed from the bioreactor to a means for separating the cells of the bleed from the liquid part of the bleed and an outlet for directing the liquid part of the bleed from the means for separating the cells of the bleed from the liquid part of the bleed back to the bioreactor and/or to the harvest outlet whereby i. continuously or one or several times during the cell culture process new cell culture medium is inserted into the bioreactor via the media inlet ii. continuously or one or several times during the cell culture process harvest is removed from the bioreactor via the harvest outlet iii. continuously or one or several times during the cell culture process a certain amount of bleed is removed from the bioreactor via the inlet of the bleed recovery device and directed to the means for separating the cells of the bleed from the liquid part of the bleed, separating the cells from the liquid part and transferring the liquid part through the outlet of the bleed recovery device back to the bioreactor and/or into the harvest.

With the bioreactor system comprising the bleed recovery device, a perfusion cell culture can be performed with more flexibility. Especially, by removing bleed without product loss, the amount of bleed that is removed from the bioreactor can be freely chosen without the need to restrict it to a minimum to reduce product loss.

In a preferred embodiment, step iii is performed by pumping a defined amount of cell suspension from the bioreactor through the inlet into the means for separating the cells of the bleed from the liquid part of the bleed. In case said means provides for separation of the cells from the liquid by sedimentation, after stopping the pumping into the means for separating the cells of the bleed from the liquid part of the bleed sedimentation starts and the cells settle and move towards the bottom of the means. As soon as the cells have settled and preferably form a solid cake on the bottom of the means, the liquid supernatant can be removed and fed back into the bioreactor or can be added to the liquid harvest. Typically, the cells are allowed to settle for 30 minutes to 5 hours, preferably for 30 minutes to 2 hours. Settling can also be done shorter/quicker, i.e. below 30 minutes, depending on the degree of cell separation required. For some processes, partial cell removal in the bleed might be sufficient if this increases flexibility.

Typically, the amount of the liquid that is fed back into the bioreactor or to the harvest, is more than 50% of the volume of the bleed cell suspension that has been removed from the bioreactor and pumped into the means for separating the cells of the bleed from the liquid part of the bleed. More preferred, more than 70 vol %, most preferred between 75 and 90 vol % are re-fed into the bioreactor or added to the harvest. Preferably it is re-fed into the bioreactor.

Preferably, the liquid part of the bleed that is re-fed into the bioreactor or added to the harvest does not comprise any cells. This might be realized by inserting into the bleed recovery device a cell retention device similar to the ones used at the harvest outlet like filtration means, acoustic devices etc. Especially if the liquid part of the bleed is re-fed into the bioreactor it is nevertheless not mandatory that it is absolutely cell-free. Consequently, when referring to the liquid part of the bleed it is meant that it is a part of the bleed that is at least reduced in the number of cells compared to the bleed that has been removed from the bioreactor and led into the bleed recovery device. Ideally it comprises less than 10%, preferably less than 5% most preferred less than 2%, e.g. around 1% of the viable cell density in the bleed that has been removed.

FIG. 3 shows the viable cell density of the liquid part of the bleed that is re-fed after sedimentation of the cells from the bleed recovery device into the bioreactor. It can be seen that the VCD remains constant until more than 80% of the liquid part of the bleed are re-fed.

Preferably, the means for separating the cells of the bleed from the liquid part of the bleed is a flat container with its smallest dimension being its height. Preferably, the height is less than half, most preferred less than one quarter of any of the other two dimensions. The other two dimensions, width and depth, can be chosen according to the amount of bleed that shall be recovered. Typically this depends on the size of the bioreactor. Dimensions between 10 cm and 100 centimeters are suitable.

While the means for separating the cells of the bleed from the liquid part of the bleed preferably works by separating the cells from the liquid supernatant by sedimentation, it is also possible to use other means. It is possible to use such means that can also be used to separate the cells from the liquid harvest like filtration, centrifugation, acoustic means, etc.

Typically, the overall process is run according to common process requirements of perfusion cell culture. Preferably, the perfusion rate is kept constant so that Perfusion rate (addition of fresh cell culture medium) (P)=Bleed rate (B)+harvest rate (H) so that a steady state perfusion is achieved.

Typically, this is regulated by a process management system, e.g. Lucullus PIMS, which e.g. uses a programmed step chain which itself reads out either pre-adjusted parameters or online signals of bioreactor probes to organize the perfusion process via controlling the pumps. Fresh medium addition is e.g. triggered automatically by decreasing bioreactor weight caused by the harvest and bleed flows out of the bioreactor.

In a preferred embodiment, the process for perfusion cell culture according to the present invention is run such that the volume of the cell suspension in the bioreactor, in the following also called liquid volume of the bioreactor, remains the nearly same over the whole time of the process, excluding the fill and grow phases at the beginning of the cell culture. Nearly the same or constant volume according to the present invention means that the liquid volume of the bioreactor does not increase to more than 110%, preferably more than 105% of the original volume and that it does not decrease to less than 90%, preferably less than 95% of the original volume.

In another preferred embodiment, the process for perfusion cell culture according to the present invention comprises continuous or semi-continuous perfusion and harvest. That means that over the whole time of the cell culture, excluding the fill and grow phases at the beginning, fresh cell culture medium is continuously or periodically added to the bioreactor and harvest is removed continuously or periodically from the bioreactor. The amount of perfusion and harvest might vary independently from each other. In one embodiment, the two streams never stop completely.

In a very preferred embodiment, in a system with constant liquid volume in the bioreactor and preferably in a system with also continuous or semi-continuous perfusion and harvest, every time while bleed is removed from the bioreactor the harvest rate is decreased by the bleed rate so that the overall amount of liquid volume that is removed from the bioreactor remains constant with variations of less than 10%, preferably less than 5%. With this, the feed of fresh medium can be kept constant. This is preferred as the removal of bleed in addition to an unchanged removal of harvest would either require the addition of excessive amounts of fresh medium to keep the bioreactor liquid volume constant or would lead to a decrease of the liquid volume within the bioreactor. If the perfusion rate P and the VCD are kept constant, also the CSPR is constant which is a requirement for long term steady state operation.

In another preferred embodiment, if liquid recovered from the bleed recovery device is pumped back into the bioreactor, the harvest rate is increased. Preferably it is increased to a rate so that the liquid volume of the bioreactor is kept constant with variations of less than 10%, preferably less than 5% without the need to amend the constant feed of fresh medium. This means, while liquid recovered from the bleed recovery device is pumped back into the bioreactor, the harvest rate is increased by the rate of the liquid bleed re-feed.

FIG. 4 shows the scheme of exemplary flow rates for a perfusion process with 2 vvd according to the present invention. Each bleed recovery operation includes four sequential phases resulting in the characteristic viable cell density (VCD) curve (black line with black dots). In phase 1, the bleed pump (dashed line with light dots) is turned off, the harvest pump is running at 2 vvd (dotted line with black triangles) while the VCD is increasing. Phase 1 is the phase where no bleed operation is triggered. In phase 2, the bleed pump is set to 2 vvd (inflow into bleed recovery device) while the harvest rate is stopped. At this time the VCD decreases by removal of cells and feed of fresh media equal to the bleed rate. In phase 3, the on/off state of the pumps is equal to phase 1 with the difference that the cells in the bleed recovery device sediment. Within this time the biomass cake is building up. Phase 4 shows the re-feed or the bleed recovery operation: the bleed pump or re-feed pump runs at −2 vvd (negative sign) since direction of the pump is reversed (outflow of the bleed recovery device). The harvest pump runs at 4 vvd to compensate the re-feed of bled medium and to maintain a constant feed of fresh medium with 2 vvd. During the phase 4 operation, the VCD only increases by the remaining cells in the nearly clarified re-red supernatant—These sequential phases are re-trigged when the biomass exceeds its setpoint.

Such regulation of liquid streams is preferably regulated by a process management system.

The present invention is also suitable for use in CFB processes. CFB processes are typically not operated in steady-state, because, due to the product accumulation in the bioreactor, the product loss through bleeding would be extremely high. However, running a CFB process in a bioreactor comprising a bleed recovery device according to the present invention and with the process of the present invention, this uniquely allows also a CFB process to be operated in steady-state as the bleed recovery minimizes the product loss.

The present invention, without being limited thereby, is further illustrated by the following examples. All literature cited above or below as well as the corresponding European patent application EP 19207666.9, filed Nov. 7, 2019, are hereby incorporated by reference.

EXAMPLES

Example 1

Evaluation of the Design for a Bleed Recovering Device by Determination of the Sedimentation Velocity of Mammalian Cells Methods:

A cylindric glas column—open on top with a stopcock at the bottom—is filled with cell suspension (viable cell density: $30 \times 10^6$ vc/mL). The cylincric columns is fixed in in tripod vertically. The cells are then left in the column over a period of 6 hours. The sedimentation is then monitored by reading out the separation line of the cells and the fluid which can be identified by a cell accumulation below the line and an nearly cell-free fluid above the line. The separation line moves downwards with increasing time. At specific time points the sedimentation length is read out. A graph is created with time [hours] on x-axis and sedimentation length [cm] I the y-axis. The trendline is calculated resulting in the slope or the sedimentation velocity.

Figure 6:
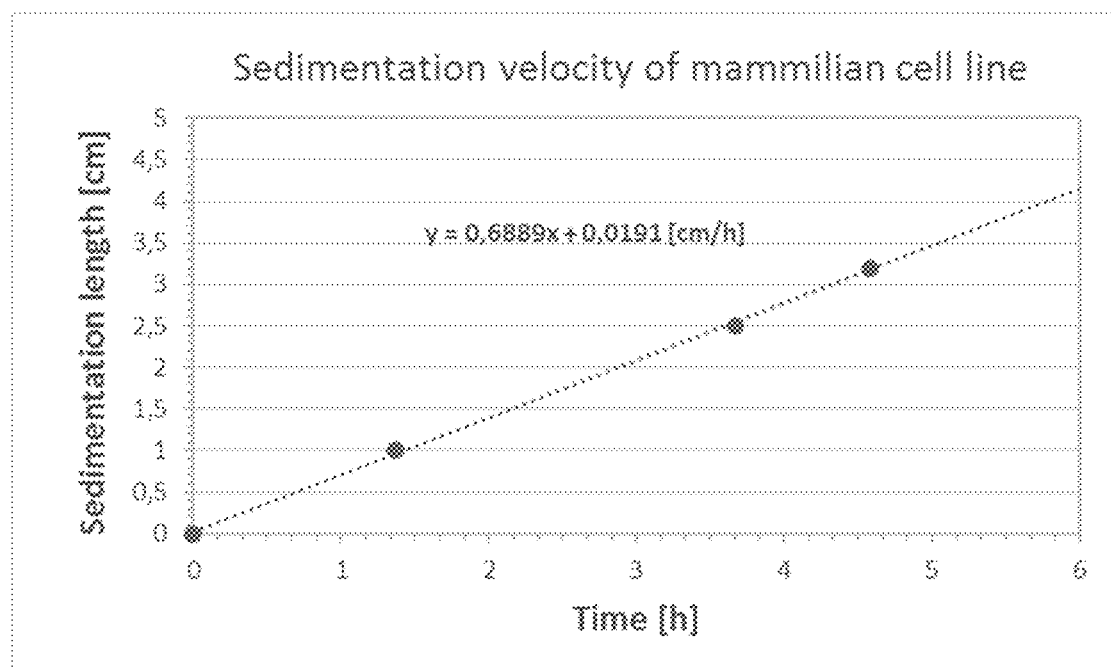
FIG. 6 shows the trend line of sedimentation over time of a mammalian cell line.

Result:

FIG. 6 shows the trend line of sedimentation over time of a mammalian cell line. The slope of the trend line is equal to the sedimentation velocity: 0.6889 cm/h Conclusion:

The design of a bleed recovering device can work best if it is flat shaped with a short sedimentation length. The short sedimentation length makes a time-reduced separation of cells and fluid possible.

To handle the bleed volume of a perfusion bioreactor, the volume in a bleed recovering device must be distributed over a larger surface.

The device must be installed a way, that is fixed without impulses from the outside Example 2

Feasibility Test of a Flat Shaped Bag Design in Bioprocess Operation

Background Information:

The test of the defined design is included into a perfusion bioreactor operation. In such a bioreactor run, the cells are seeded at low viable cell densities of 0.5 millions cells per mL and expanded to $32 \times 10^6$ viable cells/mL. Then, a steady-state is started removing the cells which otherwise would further accumulated by exponential growth. In this example, the removed cells are pumped into the flat 2D bleed recovery bag instead of just in the waste. The bleed recovery operation in this experiment includes the test of sedimentation time, appropriate handling of pumps and the test of the bag design itself. The critical questions to be answered by the experiment were as follows:

1. How much time is needed to sediment cells as short as possible to obtain a stable biomass cake/clear supernatant?
2. Under the premise of the previous questions, is it possible to re-feed the clarified supernatant without increasing the signal of the biomass probe?
3. Which pump speed is possible until the biomass cake becomes instable?
4. How much of the bleed can be recovered?

Methods:

For the investigation of the previously mentioned questions, the hardware setup of the experiment is designed as follows:

A bleed pump (speed and directions is adaptable) is used in combination with a balance and a connected bioreactor. On the balance a trough with a 2D-bag assembly is placed to measure the influx and the outflux.

The 2D plastic bag is placed in a white trough and fixed horizontally with tape. The designated inlet/outlet tube leaves the trough vertically closable with a white clamp leading to the pump. The trough's weight is controlled by the balance for the quantification of the fully bleed recovery process streams. The connection of the 2D plastic bag to the perfusion bioreactor is realized with a specific tube assembly consisting of two sealable C-Flex tubes connected by a Pharmed pump tubes:

The bioreactor is connected via the bleed line tubing via the pump with the 2D bag. Two sealable C-Flex tubes are installed for sterile connection and one tube for the pump. A sample port is integrated to control the influx and outflux streams for viable cell density and cell viability.

One of the sealable ends contains also a sample port for VCD control of the respective bleed suspension going into the bleed recovery device or/and the respective clarified supernatant going back into the bioreactor. The sample port is installed to answer questions 1.), 3.) and 4.).

Different to the commonly used bleed pump installation directly on the bioreactor control unit, an independent pump was used whose pump speed and direction can be changed. The answer of questions 2.) will be derived from the read out of the biomass signal.

Figure 7:
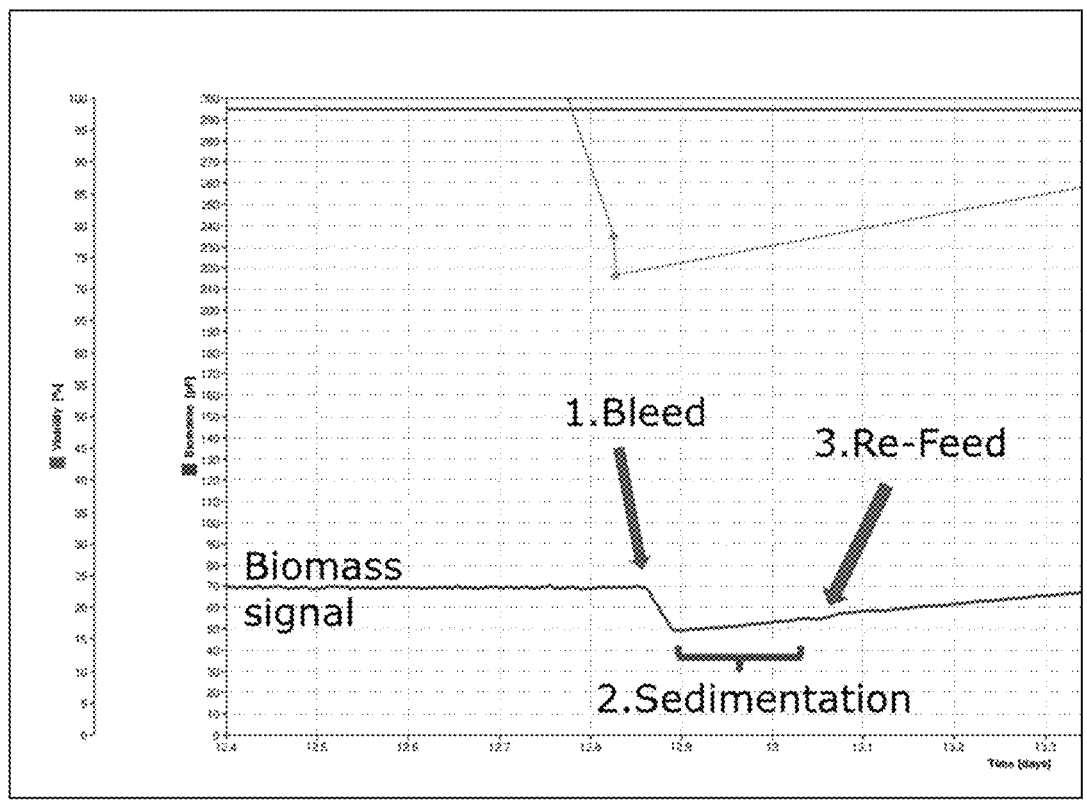
FIG. 7 describes the sequential steps of a bleed recovery process: (1) bleed of the cell suspension out of the bioreactor; (2) sedimentation/separation of the fluid from cellular particles; (3) re-feed operation of the clarified supernatant.
Figure 8:
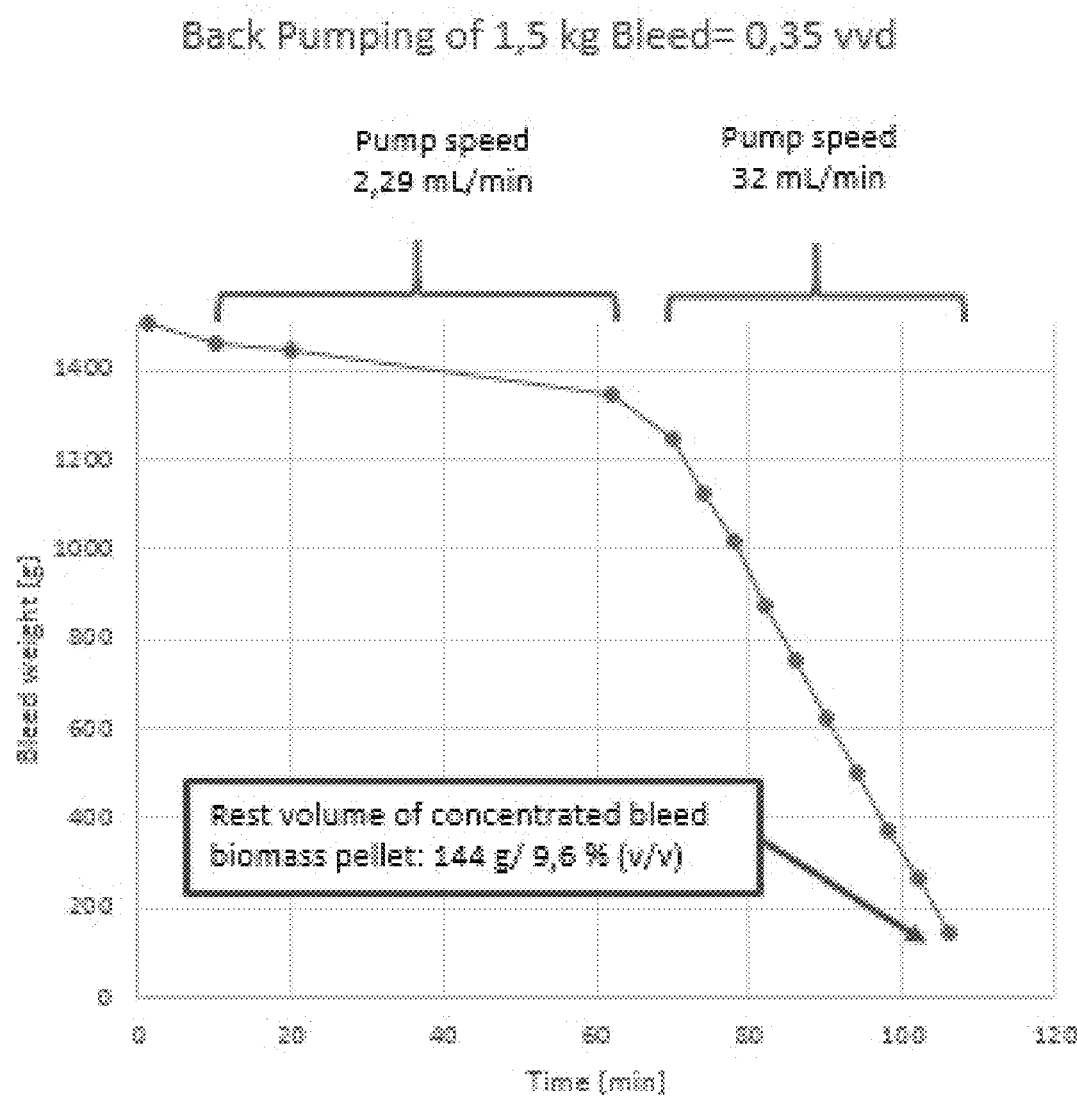
FIG. 8 illustrates the re-feed process (outflux) of the clarified supernatant of run 1 (Example 2) with two different pump speeds.

In this experiment 3 runs with the described hardware setup of the following process steps were performed. The target is to bleed the half of the total bleed amount per day. Calculation of the half of the bleed is based on the amount of the bleed of the day before:

1. Bleed the calculated amount out of the bioreactor with the maximum pump speed of 120 rpm (39.2 mL/min)
2. Sedimentation of the bleed für 120 min
3. Re-feed of the supernatant at different speeds/inline control of the VCD Biomass Signal Monitoring Results:

FIG. 7 describes the sequential steps of a bleed recovery process: (1) bleed of the cell suspension out of the bioreactor; (2) sedimentation/separation of the fluid from cellular particles; (3) re-feed operation of the clarified supernatant FIG. 8 illustrates the Re-feed process (outflux) of the clarified supernatant of run 1 with two different pump speeds. The lower pump speed pf 2.29 mL/min is applied to test, if the biomass cake gets disrupted by the pump. The biomass cake remains stable even at 32 mL/min. The remaining share of the wet biomass compared to the bleed amount is about 9.6%

Figure 9:
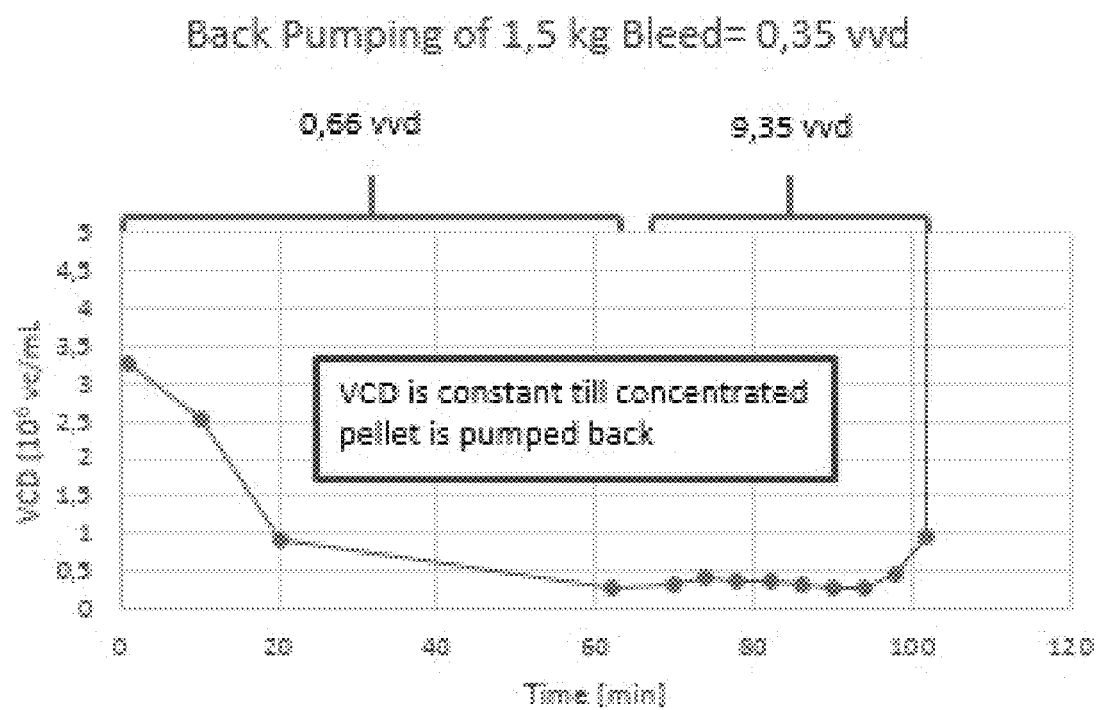
FIG. 9 illustrates the equivalent measurement of the viable cell density using a sample port.

FIG. 9 illustrates the equivalent measurement of the viable cell density using the sample port. After measuring an initial cell density of $3.3 \times 10^6$ vc/mL, it steadily decreases to below $0.5 \times 10^6$ vc/mL. The initial higher cell density comes from cell clusters sticking in the tubing of the sample port. The vertical increase of the curve indicates the point of biomass cake disruption or the maximum of supernatant to be re-fed to the bioreactor.

Overview of all Runs:

| Run | Cell density bioreactor [$10^6$ vc/mL] | Bleed amount [g] | Sedimentation time [min] | Pump speed [mL/min] | Biomass cake [%] | Biomass singal [pF] |
|---|---|---|---|---|---|---|
| 1 | 32 | 1500 | 120 | 2.27/32 | 9.6 | 53-57 |
| 2 | 37 | 1260 | | 28.46 | 14.0 | 65-68 |
| 3 | 31 | 1260 | | 28.46 | 9.5 | 58-60 |

Conclusion:

The experiments of example 2 were performed to answer the following questions:

1. How much time is needed to sediment cells as short as possible to obtain a stable biomass cake/clear supernatant?

The setup of this experiment tested a sedimentation time of 120 min. In this period of time, a stable biomass cake was built up. The stability was proven by a pump speed increase and the cell density monitoring. It remained constantly at an increased pump speed from 2.29 to about 30 mL/min as long as the maximum fluid of the bleed was recovered.

2. Under the premise of the previous questions, is it possible to re-feed the clarified supernatant without increasing the signal of the biomass probe?

The relevance of the question is given since the biomass signal is the triggering affector for the bleed process in steady-state perfusion bioreactors.

The biomass increased within a range of 2-4 pF during the re-feed process. For the assessment of the relevance of this increase, the normal fluctuation of the biomass signal in steady-state operation should be considered. Caused by either the alternating tangential flow filtration of the cell retention device or the feed/harvesting process, the cell concentration and in the consequence the biomass signal changes periodically over time. The range that can be observed is also in the range as observer during re-feed of the bleed recovery operation. In the concept of the this patent the following can be concluded;

i. the biomass signal remains in range allowing to further progress with the perfusion process in steady-state ii. redundantly working bleed recovery devices/process would easily compensate a higher increase of the biomass signal triggering the bleed operation 3. Which pumps speed is possible until the biomass cake becomes instable?

In Run1, a pump speed increase of 2.29 to 32 mL/min was tested. There the biomass cake wasn't disrupted in any way.

4. How much of the bleed can be recovered?

The share of the remaining wet biomass cake was in the range of 9.47 to 14compared to the bleed amount before the biomass cake becomes disrupted (indicated by in increase of cell density in control sample).

The questions helped to further design a next experiment in which a 2-day steady-state operation with recovery of the product from the bleed was tested.

Example 3

Bleed Recovery Operation in Steady-State Perfusion

Background Information:

Fundamental questions regarding the technical feasibility are answered by example 2. Example 3 describes a complementary experiment showing the integration of the bleed recovery concept in a perfusion steady-state operation without operational interruptions. The questions to be answered by this example is, if the biomass signal as the major parameter for steady-state control is ending up at a comparable level as before the start of the bleed recovery operation.

Methods:

A perfusion bioreactor was run with a mammalian cell line and an appropriate medium in perfusion (perfusion rate=3.66 vvd), first expanded then transitioned to a steady state operation with a biomass signal setpoint of 86.5 pF ($50 \times 10^6$ vc/mL). According to the bleed amount of the day before (0.66 vvd=2772 g), an estimation of the bleed amount per day is calculated and divided by two for two bleed recovery operations per day. When bleed recovery operation is started the automated steady-state control by biomass is switched off to manually control the steady-state in combination with the bleed recovery (see FIG. 5A)

Conceptionally, the perfusion rate needs to be kept constant during the whole bleed recovery operation in total. During the two bleed operations per day (rapid removal of the half bleed amount per day), the equal amount of fresh medium is fed into the bioreactor increasing the perfusion drastically within this short period of time. On the other hand, the perfusion rate is decreased when there is no a bleed operation. This way, the overall perfusion rate per day is kept constantly although it varies within the day.

The experiment is divided in two phases (FIG. 5B): after the bleed operations in phase 1, the cell suspension was directly re-feeded back into the bioreactor whereas in phase 2, a sedimentation time of 60 min was applied between bleed and re-feed. Both phases are containing two bleed recovery operations.

Figure 10:
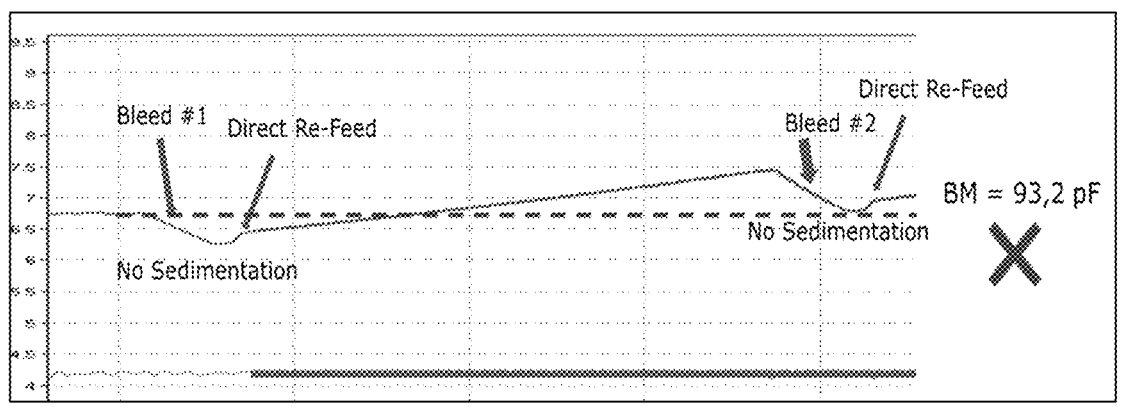
FIG. 10 illustrates phase 1 of bleed recovery operation from Example 3.

Results:

In FIG. 10, phase 1 of the experiment can be seen:

Bleed #1/2 (bleed amount 1386 g) within 130 min at 31 rpm (=640 mL/h; P=3.66 vvd), no sedimentation: performing the 3-step bleed operation the final biomass signal is 93.2 pF compared to the initial setpoint of 86.5 pF.

Figure 11:
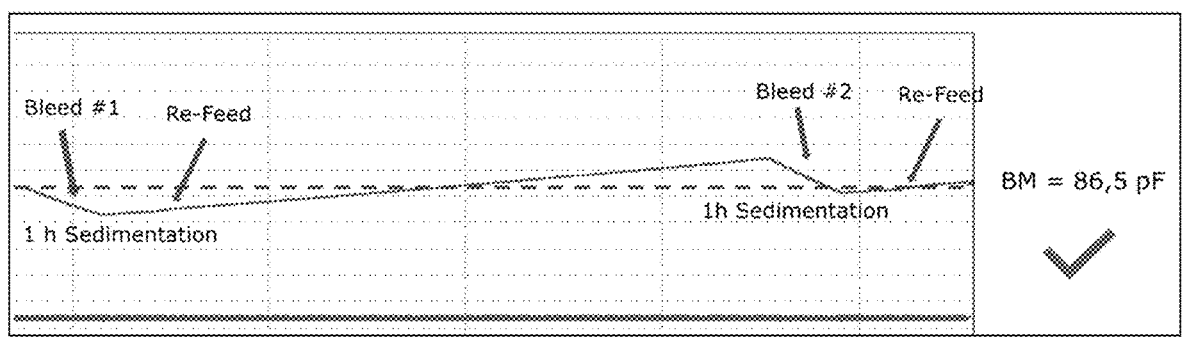
FIG. 11 illustrates phase 2 of bleed recovery operation from Example 3.

Between phase 1 and phase 2 of example 3, the biomass in the bioreactor is adjusted to 86.5 pF to having equal starting points. In FIG. 11, phase 2 of the experiment can be seen.

Bleed #1/2 (bleed amount 1386 g) within 130 min at 31 rpm (=640 mL/h; P=3.66 vvd), 1 h sedimentation: performing the 3-step bleed operation, the final biomass signal is equal to the setpoint of 86.5 pF.

Conclusion:

In this example, the bleed operation is integrated into a steady-state of a real perfusion bioreactor. Two different sedimentation forms are tested to evaluate if the biomass signal achieves the same value as before the bleed recovery operation. Without a sedimentation time, the re-feed of the bleed leads to an increase in biomass in the bioreactor whereas a sedimentation of 60 min are appropriate to end up at the same biomass signal as before the bleed recovery. Compared to example 2 with 120 min sedimentation time, 60 min seems to be efficient in example 3. This might be explainable by the longer bleed time of 130 min in this setup in which cells can already start to sediment. Example 3 showing the general applicability to steady-state perfusion processes. With this example the calculations of the total harvest amount without and with bleed recovery can be calculated (Table 2):

TABLE 2

Comparison of the yielded harvest between a steady-state perfusion bioreactor without and with bleed recovery operation.

| Parameter vvd (%) | Standard | With bleed recovery |
|---|---|---|
| P | 3.66 (100%) | 3.66 (100%) |
| H | 3.00 (82%) | 3.00 (82%) |
| B/B rec. | 0.66 (18%) | 0.52 (14%) |
| Cells | | 0.14 (4%) |
| Yield | 3 vvd (82%) | 3.52 (96%) |

Additionally to the usual harvest yield the bleed stream of 3.00 vvd, the bleed of 0.66 vvd (without recovery operation) further separate into the wet biomass cake of about 0.14 vvd going final to waste and 0.52 vvd being recovered and added up to the harvest yield. The bleed recovery operation in this example can increase the total harvest yield from 82 to 96%.

In example 3, 17% more harvest can be collected compared to the standard steady state approach without bleed recovery.

The invention claimed is:

1. A bioreactor system comprising:
   (a) a bioreactor with a perfusion inlet for fresh media; (b) a cell retention device that separates media and cells, fluidly connected to the bioreactor via a harvest outlet for delivering harvest from the bioreactor to the cell retention device, the cell retention device directs cell free media for collection and retains cells in the bioreactor; and (c) a bleed recovery device comprising a means for separating cells from liquid, fluidly connected to the bioreactor via an inlet that delivers bleed from the bioreactor to the bleed recovery device, and an outlet for directing the liquid from the bleed to either the bioreactor or for collection.

2. The bioreactor system according to claim 1, further comprising at least one pump for controlling a stream of the bleed into the bleed recovery device and into the means for separating the cells of the bleed from the liquid part of the bleed, and for controlling a stream of the liquid part of the bleed out of the means for separating the cells of the bleed from the liquid part of the bleed through the outlet of the bleed recovery device back into the bioreactor and/or to collection.

3. The bioreactor system according to claim 1, further comprising a process management system.

4. The bioreactor system according to claim 1, wherein the inlet and the outlet of the bleed recovery device comprise a plastic tube.

5. The bioreactor system according to claim 1, wherein the outlet of the bleed recovery device leads into the bioreactor.

6. The bioreactor system according to claim 1, wherein the means for separating the cells of the bleed from the liquid part of the bleed is a container for sedimentation of the cells.

7. The bioreactor system according to claim 6, wherein the outlet of the bleed recovery device is connected to the container for sedimentation of the cells at a side opposite to the inlet and in an upper half of said side opposite to the inlet.

8. The bioreactor system according to claim 1, wherein the means for separating the cells of the bleed from the liquid part of the bleed is a container for sedimentation of the cells which is a flat container with the smallest dimension being the height of the flat container that is positioned horizontally.

9. The bioreactor system according to claim 8, wherein the flat container is a plastic bag.

10. A process for perfusion cell culture, comprising:
culturing cells in a bioreactor system comprising (a) a bioreactor with a perfusion inlet for fresh media; (b) a cell retention device that separates media and cells, fluidly connected to the bioreactor via a harvest outlet for delivering harvest from the bioreactor to the cell retention device, the cell retention device directs cell free media for collection and retains cells in the bioreactor; and (c) a bleed recovery device comprising a means for separating cells from liquid, fluidly connected to the bioreactor via an inlet that delivers bleed from the bioreactor to the bleed recovery device, and an outlet for directing the liquid from the bleed to either the bioreactor or for collection wherein
  i. continuously or one or several times during the cell culture process new cell culture medium is inserted into the bioreactor via the perfusion inlet,
  ii. continuously or one or several times during the cell culture process harvest is removed from the bioreactor via the harvest outlet,
  iii. continuously or one or several times during the cell culture process a certain amount of bleed is removed from the bioreactor via the inlet of the bleed recovery device and directed to the means for separating the cells of the bleed from the liquid part of the bleed, separating the cells from the liquid part and transferring the liquid part through the outlet of the bleed recovery device back to the bioreactor and/or to collection.

11. The process according to claim 10, wherein in (iii) the liquid part of the bleed that is transferred back to the bioreactor and/or to collection comprises more than 70% of the liquid comprised in the bleed removed from the bioreactor and less than 5% of the cells comprised in the bleed removed from the bioreactor.

12. The process according to claim 10, wherein the bleed recovery device comprises a container, wherein (iii) is performed by one or several times during the cell culture process removing a certain amount of bleed from the bioreactor via the inlet of the bleed recovery device and directing it to the means for separating the cells of the bleed from the liquid part of the bleed for a period of time allowing the bleed to settle in said container so that the cells settle towards a ground of said container, after that time removing liquid supernatant above the settled cells that is reduced in cells through the outlet of the bleed recovery device back to the bioreactor and/or to collection.

13. The process according to claim 12, wherein the period of time for which the bleed is allowed to settle in the container is between 15 minutes and 2 hours.

14. The process according to claim 10, wherein the process steps (i), (ii) and (iii) are regulated such that a volume of the cell culture in the bioreactor is kept at a constant level.

15. The process according to claim 10, wherein the process is a concentrated fed-batch process in a bioreactor system comprising an ultrafiltration membrane.

16. The process according to claim 10, wherein in (iii) the liquid part of the bleed that is transferred back to the bioreactor and/or to collection comprises more than 70% of the liquid comprised in the bleed removed from the bioreactor and less than 10% of the cells comprised in the bleed removed from the bioreactor.

17. The process according to claim 10, wherein in (iii) the liquid part of the bleed that is transferred back to the bioreactor and/or to collection comprises more than 80% of the liquid comprised in the bleed removed from the bioreactor and less than 5% of the cells comprised in the bleed removed from the bioreactor.

18. The process according to claim 12, wherein the period of time for which the bleed is allowed to settle in the container is between 30 minutes and 2 hours.

19. The process according to claim 10, wherein the bioreactor system further comprises at least one pump for controlling a stream of the bleed into the bleed recovery device and into the means for separating the cells of the bleed from the liquid part of the bleed, and for controlling a stream of the liquid part of the bleed out of the means for separating the cells of the bleed from the liquid part of the bleed through the outlet of the bleed recovery device back into the bioreactor and/or to collection.

20. The process according to claim 10, wherein the inlet and the outlet of the bleed recovery device comprise a plastic tube.

* * * * *